United States Patent
Kang

(10) Patent No.: US 9,977,661 B2
(45) Date of Patent: May 22, 2018

(54) METHOD AND SYSTEM FOR GENERATING A USER INTERFACE

(71) Applicant: Tencent Technology (Shenzhen) Company Limited, Shenzhen (CN)

(72) Inventor: Liang Kang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 613 days.

(21) Appl. No.: 14/316,058

(22) Filed: Jun. 26, 2014

(65) Prior Publication Data

US 2015/0007067 A1     Jan. 1, 2015

Related U.S. Application Data

(63) Continuation of application No. PCT/CN2013/091264, filed on Dec. 31, 2013.

(30) Foreign Application Priority Data

Jun. 28, 2013    (CN) .......................... 2013 1 0271599

(51) Int. Cl.
     *G06F 9/44*        (2018.01)
(52) U.S. Cl.
     CPC ...................................... *G06F 8/38* (2013.01)
(58) Field of Classification Search
     None
     See application file for complete search history.

(56) References Cited

U.S. PATENT DOCUMENTS

| 7,428,528 | B1 * | 9/2008 | Ferrari .............. G06F 17/30855 |
| 7,672,938 | B2 | 3/2010 | Hawkins |
| 8,356,309 | B1 * | 1/2013 | Burrell .................... H04L 41/22 |
| | | | 719/321 |

(Continued)

FOREIGN PATENT DOCUMENTS

| CN | 101266543 A | 9/2008 |
| CN | 101334728 A | 12/2008 |

(Continued)

OTHER PUBLICATIONS

International Search Report and Written Opinion dated Apr. 3, 2014 for International Application No. PCT/CN2013/091264, 9 pages.

(Continued)

*Primary Examiner* — Hua Lu
(74) *Attorney, Agent, or Firm* — Brinks Gilson & Lione

(57) ABSTRACT

The present disclosure provides a method and system for generating an user interface, and the method includes: reading, by a script engine having memory and one or more processors, a user interface description file, analyzing, by the script engine, the user interface description file and generating, by the script engine, user interface data; and transmitting the user interface data to a main program wherein the main program acquires, from the script engine, a user interface element corresponding to the user interface data and draws a user interface according to the user interface element and the user interface data. The method for generating the user interface enables the main program to quickly generate the user interface.

10 Claims, 17 Drawing Sheets

(56) References Cited

U.S. PATENT DOCUMENTS

| | | | | |
|---|---|---|---|---|
| 2002/0008703 | A1* | 1/2002 | Merrill | G06F 8/00 345/473 |
| 2004/0090458 | A1* | 5/2004 | Yu | G06F 8/38 715/760 |
| 2005/0022116 | A1* | 1/2005 | Bowman | G06F 17/30896 715/234 |
| 2005/0262021 | A1* | 11/2005 | Wood | G06Q 10/10 705/44 |
| 2006/0285656 | A1* | 12/2006 | Saborowski | G06F 8/61 379/67.1 |
| 2008/0082923 | A1* | 4/2008 | Ferlitsch | G06F 9/4443 715/733 |
| 2008/0301714 | A1* | 12/2008 | Martinsen | G06F 9/4443 719/318 |
| 2009/0094249 | A1* | 4/2009 | Hawkins | G06F 17/30864 |
| 2009/0217302 | A1* | 8/2009 | Grechanik | G06F 8/70 719/320 |
| 2010/0100542 | A1* | 4/2010 | Hawthorne | G06F 17/30867 707/732 |
| 2012/0023485 | A1* | 1/2012 | Dubey | G06F 8/30 717/125 |
| 2012/0131645 | A1* | 5/2012 | Harm | G06F 21/6218 726/4 |
| 2013/0232474 | A1* | 9/2013 | Leclair | G06F 9/44 717/134 |
| 2013/0239180 | A1* | 9/2013 | Weller | G06Q 10/101 726/4 |
| 2014/0277743 | A1* | 9/2014 | Hart | B25J 9/1661 700/264 |
| 2014/0282417 | A1* | 9/2014 | Paveza | G06F 11/362 717/125 |
| 2014/0359496 | A1* | 12/2014 | Cammarata | G06F 9/4443 715/763 |

FOREIGN PATENT DOCUMENTS

| | | |
|---|---|---|
| CN | 101699393 A | 4/2010 |
| CN | 101702123 A | 5/2010 |
| CN | 101815093 A | 8/2010 |

OTHER PUBLICATIONS

Office Action dated Jan. 22, 2017 for Chinese Application No. 201310271599.8, 10 pages.

* cited by examiner

METHOD AND SYSTEM FOR GENERATING A USER INTERFACE

CROSS-REFERENCE TO RELATED APPLICATIONS

This application is a continuation of International Application No. PCT/CN2013/091264, filed on Dec. 31, 2013, which claims priority to Chinese Patent Application No. 201310271599.8, filed on Jun. 28, 2013, both of which are hereby incorporated herein by reference in their entireties.

FIELD OF THE TECHNOLOGY

The present disclosure relates to the field of computer, and particularly to a method and a system for generating a user interface.

BACKGROUND

Along with the development of the Internet technology, user interface is a bridge between the program and a user and an indispensable element in a human-computer interaction process.

SUMMARY

A method and a system for generating a user interface are disclosed. The method for generating the user interface includes: reading, by a script engine having memory and one or more processors, a user interface description file, analyzing, by the script engine, the user interface description file and generating, by the script engine, user interface data; and transmitting the user interface data to a main program wherein the main program acquires, from the script engine, a user interface element corresponding to the user interface data and draws a user interface according to the user interface element and the user interface data.

The system for generating a user interface, comprising: memory; one or more processors; and a script engine having memory and one or more processors that is configured to: read a user interface description file, analyze the user interface description file, generate user interface data and transmit the user interface data to a main program; and a main program stored in memory to be executed by one or more processors that is configured to: acquire a user interface element corresponding to the user interface data, and draw the user interface according to the user interface element that has been acquired, and the user interface data that have been adjusted.

Moreover, the method for generating a user interface, comprising: receiving, by a device having non-transitory memory and one or more processors, user interface data from a script engine; acquiring, by the device, a user interface element corresponding to the user interface data from the script engine according the user interface data; drawing, by the device, a user interface according to the user interface element and the user interface data.

And, the system for generating a user interface, comprising: memory; one or more processors; a user interface data acquiring module stored in memory and to be executed by one or more processors that is configured to receive user interface data from a script engine; a user interface element acquiring module stored in memory and to be executed by one or more processors that is configured to acquire a user interface element corresponding to the user interface data from the script engine; a drawing module stored in memory and to be executed by one or more processors that is configured to draw a user interface according to the user interface element and the user interface data.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
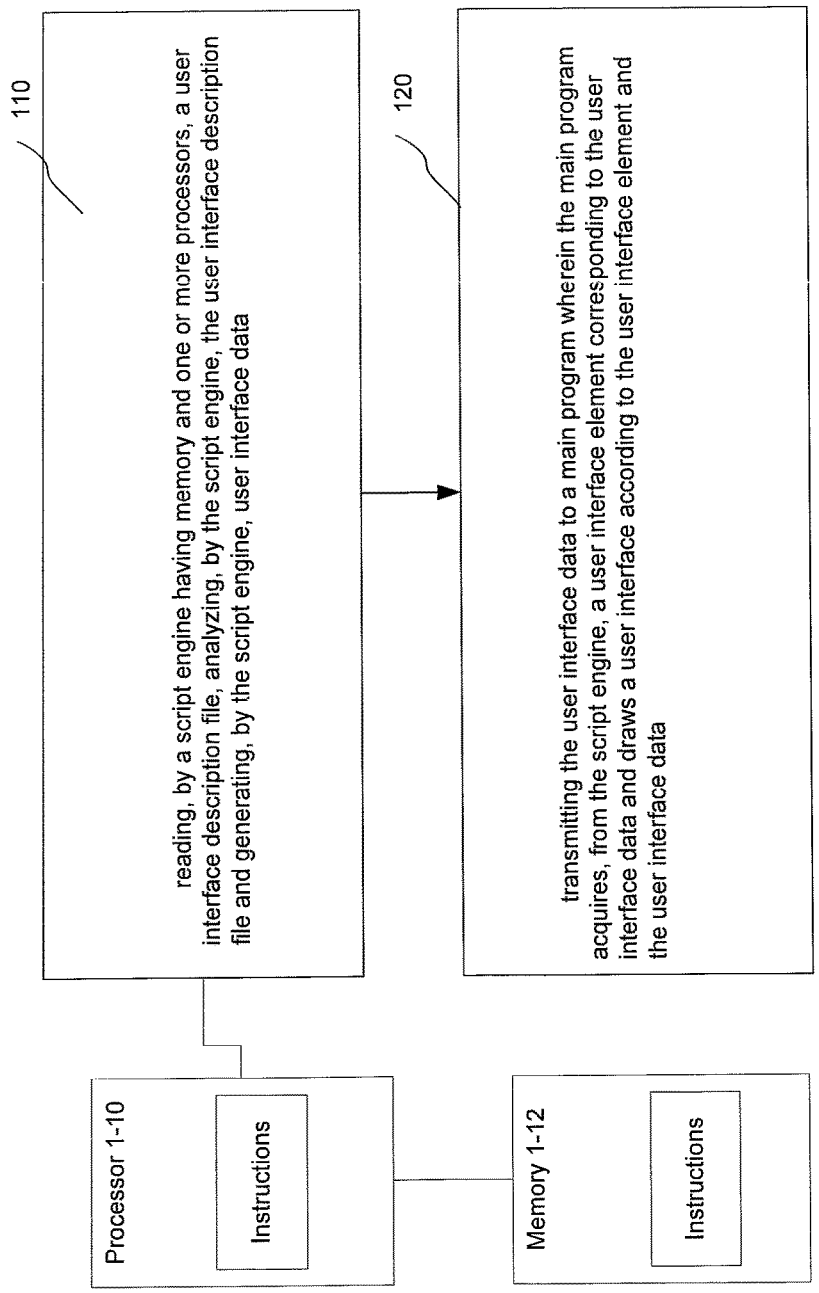
FIG. 1 shows a flow diagram of a method for generating a user interface in one example.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client can be stationary or mobile.

A server, as used herein, may refer to one or more server computers configured to provide certain server functionalities, such as database management and search engines. A server may also include one or more processors to execute computer programs in parallel.

In order for clearer explanations of purposes, technical solution and advantages of the present disclosure, the present disclosure is further described in details in combination with the attached drawings and the examples below. It should be understood that the specific examples described herein are only for the purpose of explaining the present discourse but not for limiting the present disclosure.

The inventor has found that the following problem is existing:

The traditional method for generating the user interface has to generate the user interface through reading and analyzing a user interface description file (such as an XML (Extensible Markup Language) file). When there are relatively numerous user interface elements, the user interface description fill becomes large, and the time used for analyzing the user interface description file also becomes more, thus causing the time consumed for generating the user interface to become more.

As shown in FIG. 1, in one example, a method for generating a user interface is disclosed. This example is mainly described with an example that this method for generating the user interface is applied to the terminal which includes the main program and the script engine that has memory 1-12 and one or more processors 1-10, and this terminal can comprise a smart phone, a tablet PC, a portable laptop computer, a desktop computer, and so on. This method for generating the user interface comprises:

Step 110: reading, by a script engine having memory and one or more processors, a user interface description file, analyzing, by the script engine, the user interface description file and generating, by the script engine, user interface data.

The script engine reads the user interface description file, analyzes the user interface description file to generate the user interface data and then transmits the user interface data to the main program.

A script is an executable file which is written with a specific descriptive language according to a certain format, and it is also called a macro or batch file. The script engine refers to a function library which has been packed for the purpose of realizing a preset function, and it can read and analyze the script. The user interface description file is a type of script, and it can be the Extensible Markup Language (XML) file. The user interface description file uses the descriptive language and records information required for generating the user interface. The script engine can be one executable program or one Dynamic Link Library (DLL). The script engine analyzes the user interface description file according to a preset user interface description definition, for example, when the user interface description file is the XML file, the script engine uses the preset description definition of the XML file to analyze the XML file so as to acquire the information in the XML file.

The script engine can process the information, which has been acquired through the analysis in the user interface description file, to generate the user interface data in a preset format and then transmit the user interface data to the main program. If the information in the user interface description file has already been the user interface data in the preset format, the script engine can also conduct no further processing and directly transmit such user interface data to the main program. The script engine can independently output the layout data so as to be convenient for a designer to view the effect of the user interface. For example, the script engine may generate a preview of the user interface according to the user interface description file.

In one example, the communication between the main program and the script engine can be conducted through a preset user interface, for example, the support of a JavaScript (a client-side scripting language which is based on object-driven and event-driven modes and provided with relative security) can be realized very easily by means of using an ATL (Active Template Library, a type of Microsoft program library) on a Windows platform.

Step 120: transmitting the user interface data to a main program wherein the main program acquires, from the script engine, a user interface element corresponding to the user interface data and draws a user interface according to the user interface element and the user interface data.

The main program acquires the user interface element, which corresponds to the user interface data, from the script engine according to the user interface data and draws the user interface according to the user interface element which has been acquired and the user interface data.

The main program is an application program which needs to generate the user interface, and it receives the user interface data directly from the script engine so as to acquire the user interface element, which corresponds to the user interface data, from the script engine according to the user interface data. There is one user interface element library which exists in the script engine and includes the user interface element which is required for generating the user interface. The user interface data record the user interface element which is required for generating the user interface, and the main program acquires the user interface element, which is required for generating the user interface, from this user interface element library according to the user interface data and then draws the user interface according to the user interface data. The user interface element, such as a control icon, is a basic visual element which is required for generating the user interface, and it can be a picture.

The script engine can run independently from the main program and prior to the running of the main program, for example, the script engine having memory 1-12 and one or more processors 1-10 is started when the terminal is booted, the main program acquires the user interface data directly from the script engine at the time of being started so as to further acquire the user interface element from the script engine according to the user interface data for the purpose of drawing the user interface.

In one example, the main program detects the function trigger event directed towards the user interface element; when the main program has detected the function trigger event, it completes the function of the user interface element, which corresponds to the function trigger event, according to the function trigger event. In this example, the user interface description file only records the information, which is required for generating the user interface, and does not define any function of the user interface element, and the function of the user interface element is realized by the main program. The main program can detect the function trigger event, such as a mouse click and a shortcut, directed towards the user interface element, give feedback to the function trigger event according to a preliminary definition and complete the function of the user interface element which corresponds to the function trigger event.

In this example, the user interface data are directly provided by the script engine, and the realization of the step that the main program completes the function of the user interface element reduces the additional time consumed for generating the user interface when the main program is started.

In this example, the script engine reads and analyzes the user interface description file to generate the user interface data and then transmits the user interface data to the main program. The main program receives the user interface data directly from the script engine and acquires the user interface element, which is required for generating the user interface, from the script engine according to the user interface data so as to draw the user interface according to the user interface element which has been acquired and the user interface data, and in comparison with the prior art, the step that the main program reads and analyzes the user interface description file is reduced, which enables the main program to quickly generate the user interface.

Figure 2:
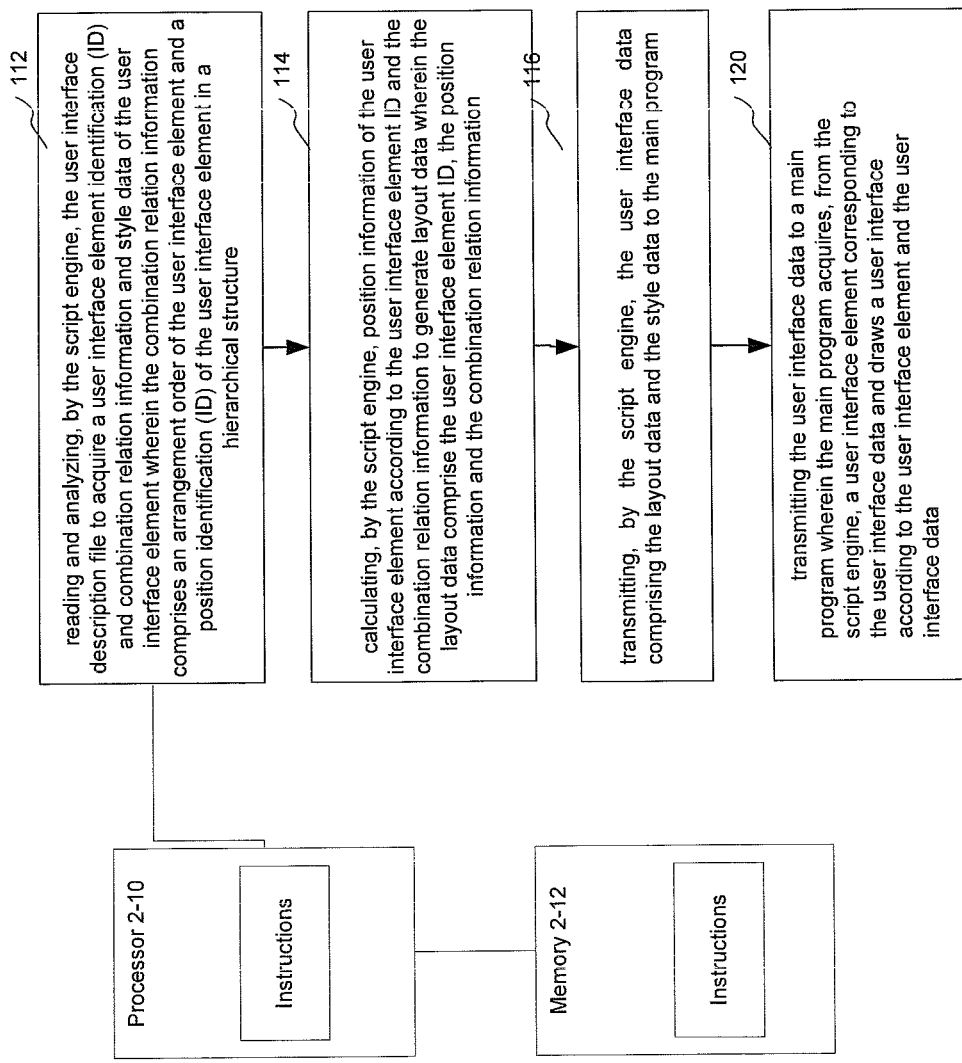
FIG. 2 shows a flow diagram of a method for generating a user interface in another example.

As shown in FIG. 2, this is a flow diagram of a method for generating a user interface in another example. In this example, the step 110 that the script engine having memory 2-12 and one or more processors 2-10 reads the user interface description file, analyzes the user interface description file to generate the user interface data and then transmits the user interface data to the main program comprises:

Step 112: reading and analyzing, by the script engine, the user interface description file to acquire a user interface element identification (ID) and combination relation information and style data of the user interface element wherein the combination relation information comprises an arrangement order of the user interface element and a position identification (ID) of the user interface element in a hierarchical structure.

The script engine reads and analyzes the user interface description file so as to acquire the user interface element ID as well as the combination relation information and the style data of the user interface element, wherein the combination relation information of the user interface element comprises the arrangement order of the user interface element and the position ID of the user interface element in the hierarchical structure.

The user interface element ID can uniquely identify the user interface element, and the main program can call the user interface element, which is required for generating the user interface, from the user interface element library of the script engine according to the user interface element ID. The style data can make a further adjustment of the user interface element when the main program generates the user interface, and in one example, the style data can comprise at least one of the following items, i.e., the color, the font, the font size, and whether the user interface element is displayed or not.

The combination relation information of the user interface element comprises the arrangement order of the user interface element and the position ID of the user interface element in the hierarchical structure. The arrangement order of the user interface element can show the arranged position of the user interface element relative to other user interface elements. The hierarchical structure makes the user interface element be well arranged with a clear mutual relation through a hierarchy so as to be convenient for the adjustment of the user interface element. The position ID of the user interface element in the hierarchical structure can identify a relative position of the user interface element in the hierarchical structure and also indicate whether the user interface element is overlaid above or under other user interface elements or not and whether this user interface element includes or is included other user interface elements or not.

Figure 3:
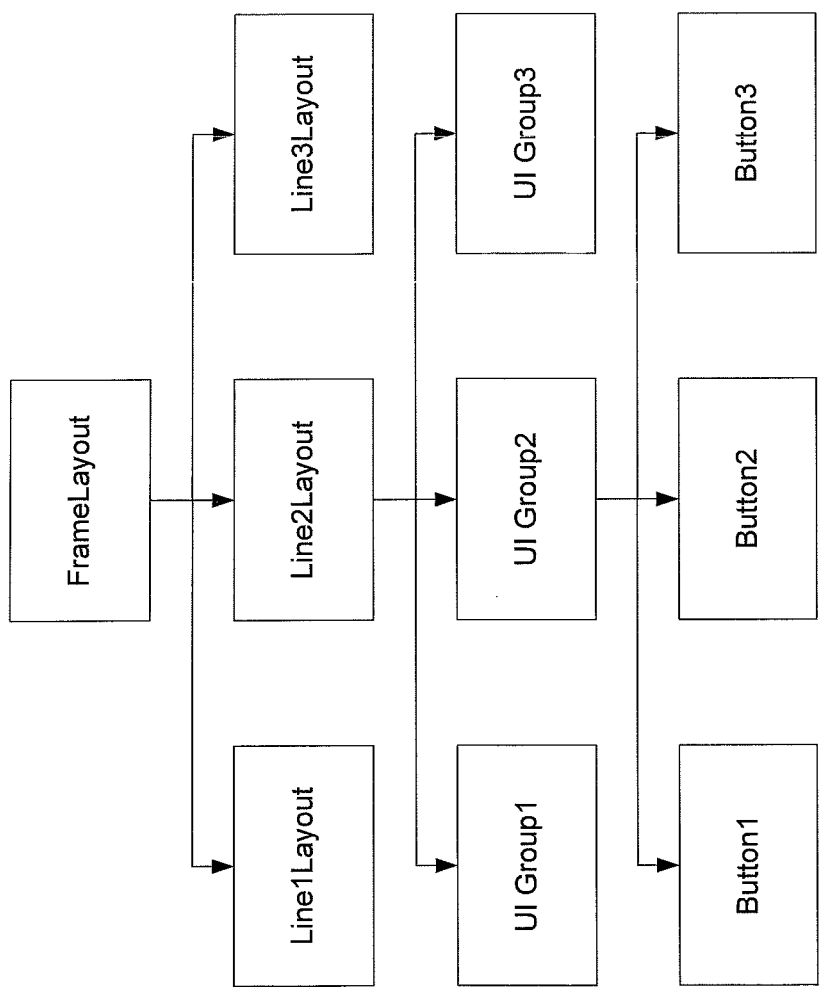
FIG. 3 shows a structural block diagram of a hierarchical structure in one example.

As shown in FIG. 3, this is a structural block diagram of a hierarchical structure in one example, and this hierarchical structure comprises: at least one frame (such as FrameLayout in FIG. 3), at least one line (such as Line1Layout, Line2Layout and Line3Layout in FIG. 3), at least one user interface element (such as Button1, Button2 and Button3) and at least one group (such as UI Group1, UI Group2 and UI Group3); the frame includes the line, the line includes the group or the user interface element, and the group includes the user interface element. For example, the Line2Layout includes three groups, i.e., the UI Group1, the UI Group2 and the UI Group3, and the UI Group2 includes three user interface elements, i.e., the Button1, the Button2 and the Button3.

It is necessary to state that the line can directly comprise the element user interface and that the hierarchical structure can have no group. The frame is used for indicating the area where the whole user interface is displayed, and it can include a plurality of lines; the group is a combination of a plurality of user interface elements, and one group can include a plurality of user interface elements. The position ID of the user interface element in this hierarchical structure can comprise a line ID, and when the group still exists, the position ID can also comprise a group ID. The line ID can indicate which line the user interface element belongs to, and the group ID can indicate which group the user interface element belongs to.

Step 114 as shown in FIG. 2: calculating, by the script engine, position information of the user interface element according to the user interface element ID and the combination relation information to generate layout data wherein the layout data comprise the user interface element ID, the position information and the combination relation information.

The script engine calculates the position information of the user interface element according to the user interface element ID and the combination relation information of the user interface element so as to generate the layout data, wherein the layout data comprise the user interface element ID, the position information of the user interface element and the combination relation information of the user interface element.

the script engine calculates the position information of the user interface element according to the user interface element ID and the combination relation information of the user interface element so as to generate the layout data, wherein the layout data comprise the user interface element ID, the position information of the user interface element and the combination relation information of the user interface element.

The script engine can calculate the position information of the user interface element according to the user interface element ID and the combination relation information of the user interface element. The combination relation information of the user interface element indicates a relative position of the user interface element, and the script engine can acquire a specific position of the user interface element through the calculation. For example, in the combination relation information of the user interface element, the user interface element is indicated to be located in the "middle", specific coordinates of this user interface element in the drawing process can be acquired through the calculation.

In one example, the script engine acquires the size information of the user interface element according to the user interface element ID; the script engine calculates the position information of the user interface element line by line from the first line of the hierarchical structure according to the size information and the combination relation information of the user interface element. In this example, the size information of the user interface element can be the width and the height of the control icon.

Figure 4:
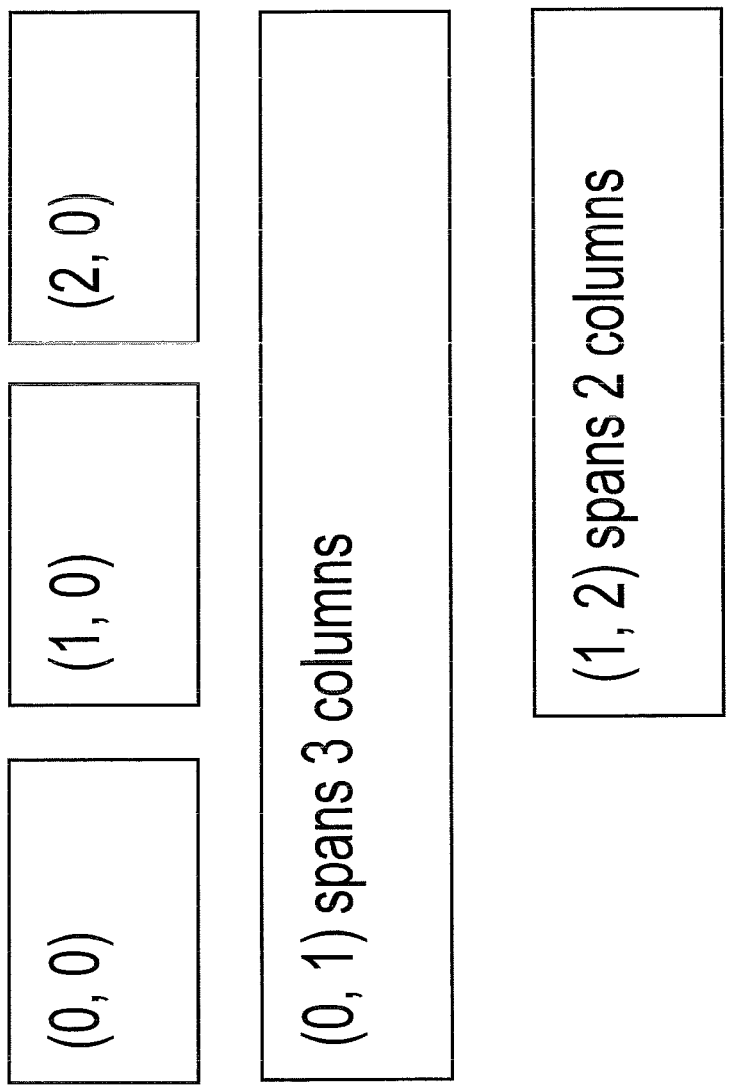
FIG. 4 shows a schematic diagram of position information of a user interface element in one example.

As shown in FIG. 4, this is a schematic diagram of position information of a user interface element in one example. The script engine can acquire the position information of the user interface element through the calculation, wherein the position information comprises the initial coordinates, the height and the width of the user interface element in the drawing area. The initial coordinates, the height and the width can determine the position and the size of the user interface element in the drawing area. In this example, in the drawing area (the area for drawing the user interface), the coordinates at the upper left corner start from (0, 0), a coordinate axis X is located rightwards, and a coordinate axis Y is located downwards.

The script engine reads and analyzes the XML file (the user interface description file) to have acquired the IDs of five control icons (the user interface element ID), the combination relation information of the user interface element as well as the font, the size and the color (style data) of text displayed on the controls, and the combination relation information of the user interface element comprises a precedence order of the control icons at the time of drawing (the arrangement order of the user interface element) as well as the quantity of lines and the quantity of groups of the control icons in the hierarchical structure (the position ID of the user interface element in the hierarchical structure). The three control icons are located in the first line, they belong to the first group, and they are arranged according to the arrangement order of the user interface element; one control icon is located in the second line; one control icon and one empty group are located on the third line.

At the time of calculating the position information, the script engine calculates the position information of the user interface element line by line from the first line of the hierarchical structure according to the size information and the combination relation information of the user interface element.

The script engine first calculates the initial coordinates, the height and the width of each of the three control icons in the first line in the drawing area, for example, as shown in the figure, the corresponding initial coordinates of the control icon, which is arranged first in the first line, in the drawing area are exactly (0, 0) (in this example, the initial coordinates refer to the corresponding coordinates of the control icon at the upper left corner in the drawing area); the corresponding initial coordinates of the control icon, which is arranged second in the first line, in the drawing area are exactly (1, 0), and the value of the coordinate X of the control icon is determined according to the width of the control icon which is arranged first in the first line; the width of the group in the first line is the sum of the widths of the three icons. Then it calculates the second line and the third line in proper order.

The group that is arranged first in the third line is an empty group and allowed not to be drawn; the initial coordinates of the control icon, which is arranged second in the third line, are (1, 2), the value of the coordinate X of the control icon is determined according to the width of the empty group, the value of the coordinate Y of the control icon is determined according to the quantity of the lines, and the height and the width of the control icon in the drawing area are determined according to the size information of this control icon.

As shown in FIG. 4, through the calculation, for the user interface element at the upper left corner, it the initial coordinates are (0, 0), its height is 1 (the coordinate Y), and its width is 1 (the coordinate X); for the user interface element in the second line, under the condition that (0, 1) spans 3 columns, which indicates that its initial coordinates are (0, 1), its height is 1 (the coordinate Y), and its width is 3 (the coordinate X).

Step 116 of FIG. 2: transmitting, by the script engine, the user interface data comprising the layout data and the style data to the main program.

The script engine transmits the user interface data, which comprise the layout data and the style data, to the main program.

The script engine transmits the layout data, which have been acquired after the calculation, together with the style data, which correspond to the layout data, as the user interface data to the main program so as for the main program to draw the user interface.

In this example, the script engine calculates the position information of the user interface element through acquiring the user interface element ID and the combination relation of the user interface element from the user interface description file, transmits the layout data, which comprise the user interface element ID, the position information of the user interface element and the combination relation information of the user interface element, together with the style data as the user interface data to the main program, which significantly reduces the consumed time due to the step that the main program reads the user interface description file, and the main program acquires the user interface data directly from the script engine when the user interface needs to be generated so as to generate the user interface, which reduces the time consumed for generating the user interface.

Figure 5:
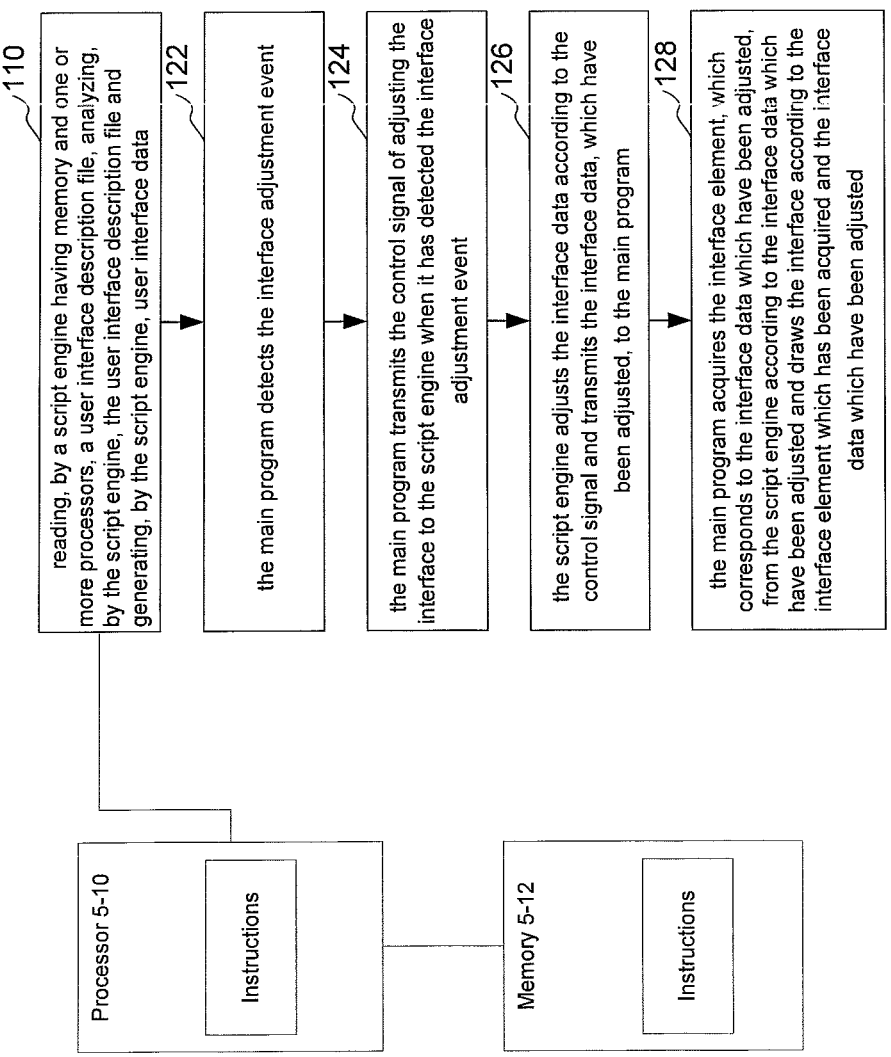
FIG. 5 shows a flow diagram of a method for generating a user interface in one example.

As shown in FIG. 5, this is a flow diagram of a method for generating a user interface in one example. In this example, the step that the main program acquires the user interface element, which corresponds to the user interface data, from the script engine having memory 5-12 and one or more processors 5-10 according to the user interface data and draws the user interface according to the user interface element which has been acquired and the user interface data comprises:

Step 122: the main program detects the user interface adjustment event.

The main program stored in memory 5-12 and to be executed by one more processors 5-10 detects the user interface adjustment event so as to determine whether it is necessary to adjust the user interface or not. In one example, the user interface adjustment event comprises: at least one of the following items, i.e., the creating of the user interface element, the hiding of the user interface element, the deleting of the user interface element, the moving of the user interface element, the zooming of the window, the changing of the color, and the changing of the font. The user interface adjustment event can also be mouse clicking on a preset area.

Step 124: the main program transmits the control signal of adjusting the user interface to the script engine when it has detected the user interface adjustment event.

The main program can transmit the control signal of adjusting the user interface to the script engine when it has detected the user interface adjustment event. The main program can also directly adjust the user interface, such as the zooming of the user interface element, and the adjustment of the color and the font of the user interface element.

Step 126: the script engine adjusts the user interface data according to the control signal and transmits the user interface data, which have been adjusted, to the main program.

The control signal transmitted by the main program can specifically include which user interface elements have been adjusted, and the script engine adjusts the user interface data according to the control signal. If there is any change in the position of one user interface element or the positions of a plurality of user interface elements, it is feasible to recalculate the position information of this user interface element or the plurality of user interface elements. In one example, it is also feasible to adjust the user interface data through changing the position ID of the user interface element in the hierarchical structure.

Step 128: the main program acquires the user interface element, which corresponds to the user interface data which have been adjusted, from the script engine according to the user interface data which have been adjusted and draws the user interface according to the user interface element which has been acquired and the user interface data which have been adjusted.

The main program receives the user interface data, which have been adjusted, from the script engine and acquires the user interface element from the script engine according to the user interface data, which have been adjusted, so as to draw the user interface.

Figure 6:
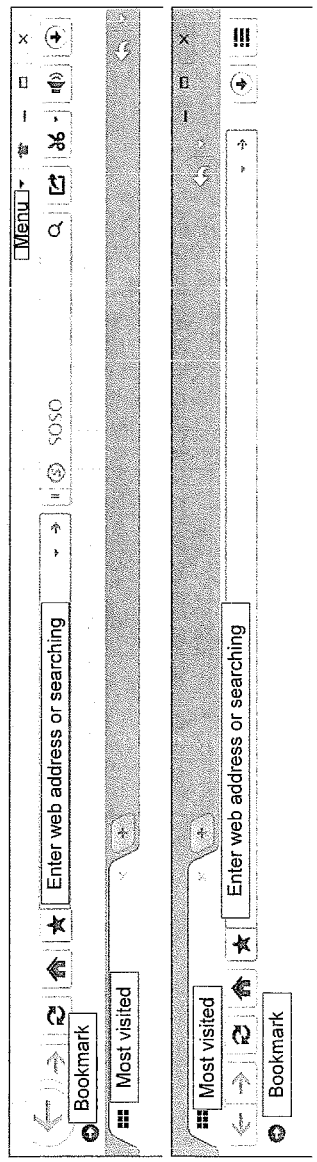
FIG. 6 shows a schematic diagram of adjusting a user interface in one example.

As shown in FIG. 6, this is a schematic diagram of adjusting the user interface in one example. In this example, it is feasible to adjust the user interface through detecting the mouse clicking on a preset function key of adjusting the user interface. Two different user interfaces are as shown in FIG. 6, a plurality of user interface generating solutions can be preset in the user interface description file, and the script engine can respectively generate different user interface data corresponding to the different solutions. The main program first receives the user interface data of one of the solutions, and when the main program has detected the preset event of adjusting the user interface, the script engine directly transmits the user interface data of another solution to the main program, which significantly improves the efficiency of generating the user interface.

In this example, through detecting the user interface adjustment event, it is feasible to determine whether the main program is necessary to adjust the user interface or not, when the user interface adjustment event has been detected, the control signal of adjusting the user interface is transmitted to the script engine, the script engine completes the adjustment of the user interface data, and the main program receives the user interface data which have been adjusted and draws the user interface according to the user interface data which have been adjusted; in this way, the user interface can be adjusted flexibly, and the efficiency of generating the user interface can be improved.

Figure 7:
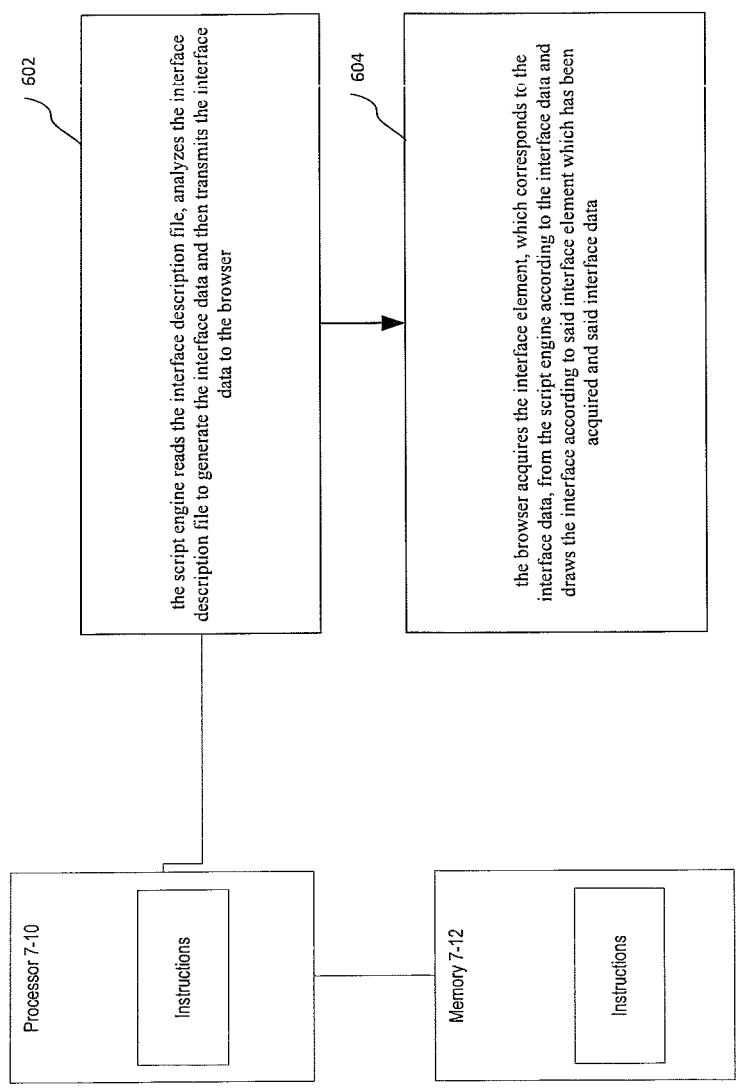
FIG. 7 shows a flow diagram of a method for generating a user interface in one example.

As shown in FIG. 7, the main program stored in memory 7-12 and to be executed by one more processors 7-10 is a browser, and this method for generating the user interface comprises: step 602: the script engine having memory 7-12 and one or more processors 7-10 reads the user interface description file, analyzes the user interface description file to generate the user interface data and then transmits the user interface data to the browser.

In on example, the script engine reads and analyzes the user interface description file so as to acquire the user interface element ID as well as the combination relation information and the style data of the user interface element, wherein the combination relation information of the user interface element comprises the arrangement order of the user interface element and the position ID of the user interface element in the hierarchical structure.

In on example, the script engine calculates the position information of the user interface element according to the user interface element ID and the combination relation information of the user interface element so as to generate the layout data, wherein the layout data comprise the user interface element ID, the position information of the user interface element and the combination relation information of the user interface element.

In on example, the script engine transmits the user interface data, which comprise the layout data and the style data, to the browser.

In one example, the style data comprise at least one of the following items, i.e., the color, the font, the font size, and whether the user interface element is displayed or not.

In one example, the hierarchical structure comprises: at least one frame, at least one line and at least one user interface element; wherein the frame includes the line, and the line includes the user interface element.

In one example, the hierarchical structure further comprises: at least one group, and the group includes the user interface element.

In one example, the script engine acquires the size information of the user interface element according to the user interface element ID; the script engine calculates the position information of the user interface element line by line from the first line of the hierarchical structure according to the size information and the combination relation information of the user interface element.

In one example, the position information comprises: the initial coordinates, the height and the width of the user interface element in the drawing area.

Step 604: the browser acquires the user interface element, which corresponds to the user interface data, from the script engine according to the user interface data and draws the user interface according to the user interface element which has been acquired and the user interface data.

In one example, the browser detects the user interface adjustment event; the browser transmits the control signal of adjusting the user interface to the script engine when it has detected the user interface adjustment event; the script engine adjusts the user interface data according to the control signal and transmits the user interface data, which have been adjusted, to the browser; the browser acquires the user interface element, which corresponds to the user interface data which have been adjusted, from the script engine according to the user interface data which have been adjusted and draws the user interface according to the user interface element which has been acquired and the user interface data which have been adjusted.

In one example, the user interface adjustment event comprises: at least one of the following items, i.e., the creating of the user interface element, the hiding of the user interface element, the deleting of the user interface element, the moving of the user interface element, the zooming of the window, the changing of the color, and the changing of the font.

In one example, the browser detects the function trigger event directed towards the user interface element; when the browser has detected the function trigger event, it completes the function of the user interface element, which corresponds to this function trigger event, according to this function trigger event.

In this example, the browser acquires the user interface data directly from the script engine and draws the user interface according to the user interface data so that the step of reading and analyzing the user interface description file and the step of processing the information, which has been analyzed, are reduced, which enables the browser to quickly generate the user interface.

Figure 8:
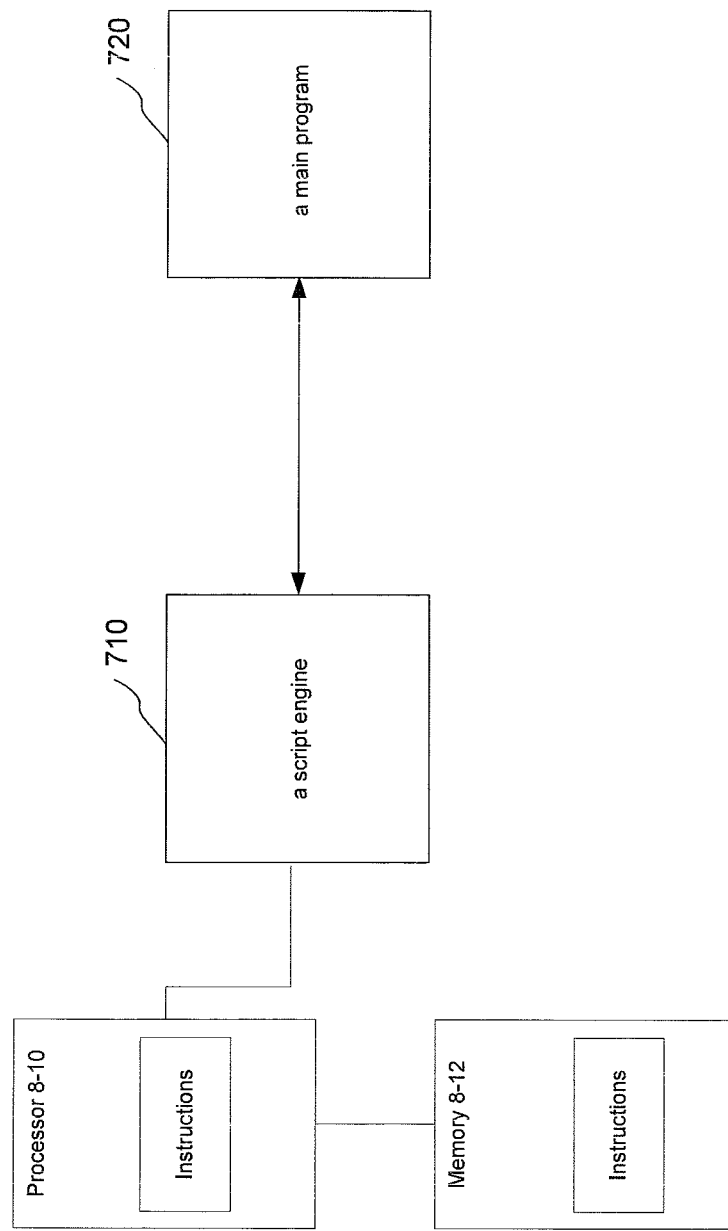
FIG. 8 shows a structural block diagram of a system for generating a user interface in one example.

As shown in FIG. 8, in one example, a system for generating the user interface is also disclosed, and this system comprises:

a script engine 710 having memory 8-12 and one or more processors 8-10 that is configured to read the user interface description file, to analyze the user interface description file to generate the user interface data and then to transmit the user interface data to the main program.

The script engine 710 can be one executable program or one DLL. The script engine 710 can process the information, which has been acquired through the analysis in the user interface description file, to generate the user interface data in a preset format and then transmit the user interface data to the main program 720. If the information in the user interface description file has already been the user interface data in the preset format, the script engine 710 can also conduct no further processing and directly transmit such user interface data to the main program 720. The script engine 710 can independently output the layout data so as to be convenient for a designer to view the effect of the user interface.

The main program 720 is configured to receive the user interface data from the script engine 710, to acquire the user interface element, which corresponds to the user interface data, from the script engine 710 according to the user interface data and then to draw the user interface according to the user interface element which has been acquired and the user interface data.

The main program 720 directly receives the user interface data from the script engine 710 so as to acquire the user interface element, which corresponds to the user interface data, directly from the script engine 710 according to the user interface data. There is one user interface element library which exists in the script engine 710 and includes the user interface element which is required for generating the user interface. The user interface data record the user interface element which is required for generating the user interface, and the main program 720 acquires the user interface element, which is required for generating the user interface, from this user interface element library according to the user interface data and then draws the user interface according to the user interface data.

The script engine 710 can run independently from the main program 720 and prior to the running of the main program, for example, the script engine 710 is started when the terminal is booted, the main program 720 acquires the user interface data directly from the script engine 710 at the time of being started so as to further acquire the user interface element from the script engine 710 according to the user interface data for the purpose of drawing the user interface.

In this example, the script engine 710 reads and analyzes the user interface description file to generate the user interface data and transmits the user interface data to the main program 720. The main program 720 receives the user interface data directly from the script engine 710 and acquires the user interface element, which is required for generating the user interface, from the script engine 710 according to the user interface data so as to draw the user interface according to the user interface element which has been acquired and the user interface data, and in comparison with the prior art, the step that the main program 720 reads and analyzes the user interface description file is reduced, which enables the program to quickly generate the user interface.

Figure 9:
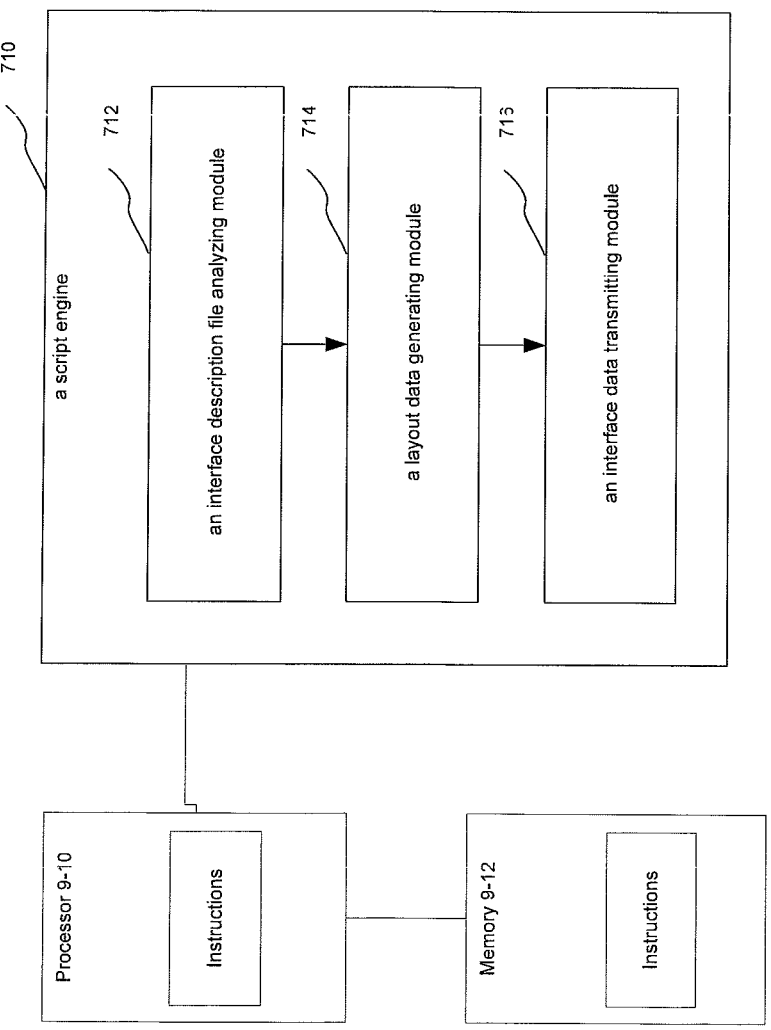
FIG. 9 shows a structural block diagram of a script engine as shown in FIG. 8.

As shown in FIG. 9, in one example, the script engine 710 comprises:

an user interface description file analyzing module 712 stored in memory 9-12 and to be executed by one or more processors 9-10 that is configured to read and analyze the user interface description file so as to acquire the user interface element ID as well as the combination relation information and the style data of the user interface element, wherein the combination relation information of the user interface element comprises the arrangement order of the user interface element and the position ID of the user interface element in the hierarchical structure.

The user interface element ID can uniquely identify the user interface element, and the user interface description file analyzing module 712 stored in memory 9-12 and to be executed by one or more processors 9-10 can call the user interface element, which is required for generating the user interface, from the user interface element library of the script engine 710 according to the user interface element ID. The style data can make a further adjustment of the user interface element when the main program generates the user interface, and in one example, the style data can comprise at least one of the following items, i.e., the color, the font, the font size, and whether the user interface element is displayed or not.

The combination relation information of the user interface element comprises the arrangement order of the user interface element and the position ID of the user interface element in the hierarchical structure. The arrangement order of the user interface element can show an arranged position of the user interface element relative to other user interface elements. The hierarchical structure makes the user interface element be well arranged with a clear mutual relation through a hierarchy so as to be convenient for the adjustment of the user interface element. The position ID of the user interface element in the hierarchical structure can identify the relative position of the user interface element in the hierarchical structure and also indicate whether the user interface element is overlaid above or under other user interface elements or not and whether this user interface element includes or is included other user interface elements or not.

In one example, the hierarchical structure comprises: at least one frame, at least one line and at least one user interface element; wherein the frame includes the line, and the line includes the user interface element. The hierarchical structure can further comprise the group, and the group includes the user interface element. The position ID of the user interface element in this hierarchical structure can comprise the line ID and also the group ID.

A layout data generating module 714 stored in memory 9-12 and to be executed by one or more processors 9-10 that is configured to calculate the position information of the user interface element according to the user interface element ID and the combination relation information of the user interface element so as to generate the layout data, wherein the layout data comprise the user interface element ID, the position information of the user interface element and the combination relation information of the user interface element.

The layout data generating module 714 can calculate the position information of the user interface element according to the user interface element ID and the combination relation information of the user interface element. The combination relation information of the user interface element indicates a relative position of the user interface element, and the script engine 710 can acquire a specific position of the user interface element through the calculation.

Figure 10:
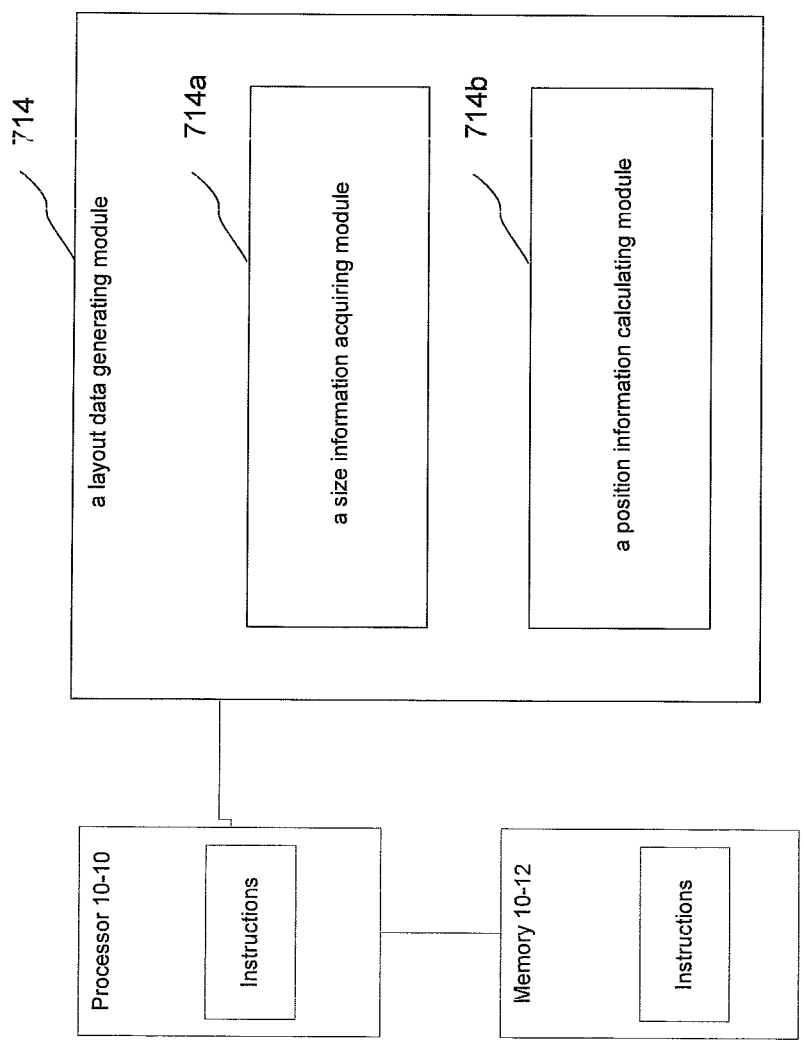
FIG. 10 shows a structural block diagram of a layout data generating module as shown in FIG. 9.
Figure 11:
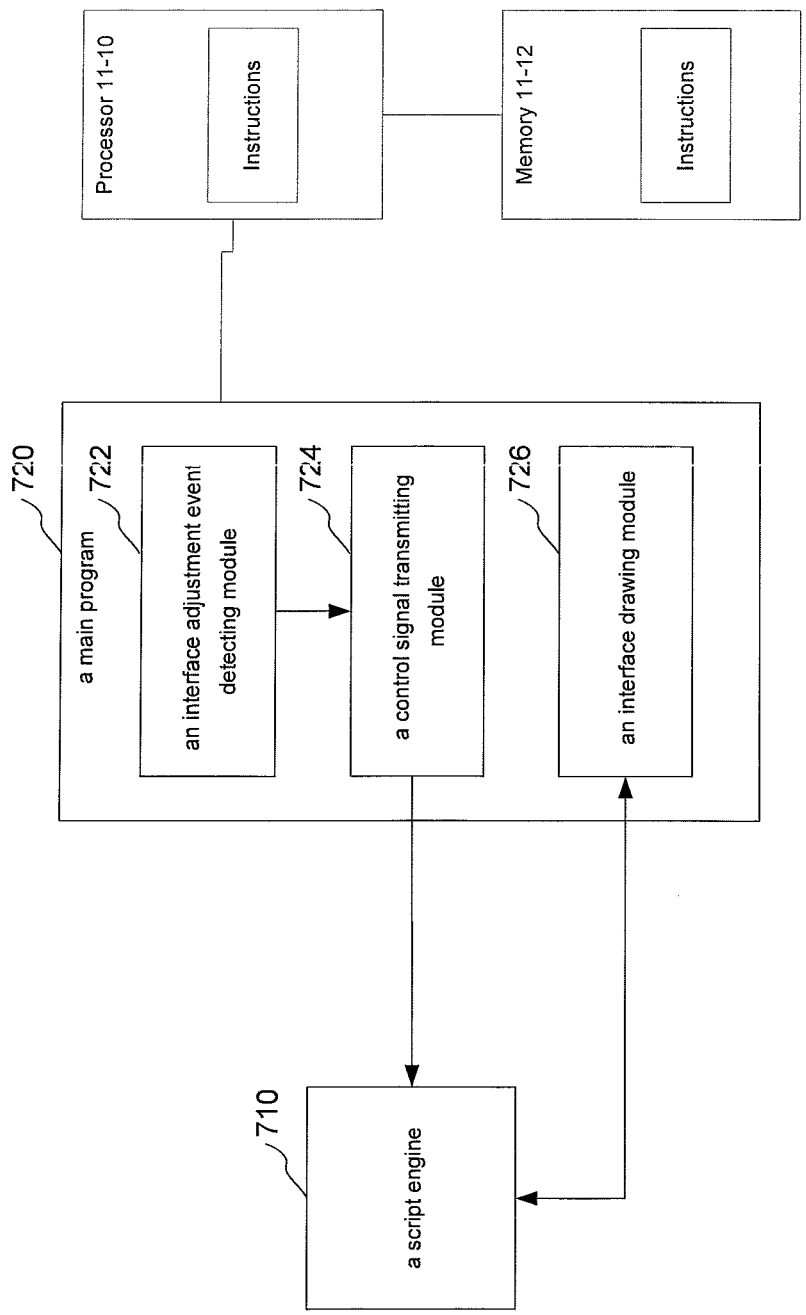
FIG. 11 shows a structural block diagram of a system for generating a user interface in another example.

As shown in FIG. 10, in one example, the layout data generating module 714 stored in memory 10-12 and to be executed by one or more processors 10-10 further comprises:

a size information acquiring module 714*a* stored in memory 10-12 and to be executed by one or more processors 10-10 that is configured to acquire the size information of the user interface element according to the user interface element ID;

a position information calculating module 714*b* stored in memory 10-12 and to be executed by one or more processors 10-10 that is configured to calculate the position information of the user interface element line by line from the first line of the hierarchical structure according to the size information and the combination relation information of the user interface element;

an user interface data transmitting module 716 in FIG. 9 stored in memory 9-12 and to be executed by one or more processors 9-10 that is configured to transmit the user interface data, which include the layout data and the style data, to the main program 720 in FIG. 11.

The user interface data transmitting module 716 transmits the layout data, which have been acquired after the calculation, together with the style data, which correspond to the layout data, as the user interface data to the main program 720 so as for the main program 720 to draw the user interface In one example, the position information comprises: the initial coordinates, the height and the width of the user interface element in the drawing area.

In this example, the script engine 710 calculates the position information of the user interface element through acquiring the user interface element ID and the combination relation of the user interface element from the user interface description file, transmits the layout data, which comprise the user interface element ID, the position information of the user interface element and the combination relation information of the user interface element, together with the style data as the user interface data to the main program 720, which significantly reduces the consumed time due to the step that the main program 720 reads the user interface description file, and the main program 720 acquires the user interface data directly from the script engine 710 when the user interface needs to be generated so as to generate the user interface, which reduces the time consumed for generating the user interface.

As shown in FIG. 11, in one example, the main program 720 comprises:

an user interface adjustment event detecting module 722 configured to detect the user interface adjustment event.

The user interface adjustment event detecting module 722 stored in memory 11-12 and to be executed by one or more processors 11-10 detects the user interface adjustment event so as to determine whether it is necessary to adjust the user interface or not. In one example, the user interface adjustment event comprises: at least one of the following items, i.e., the creating of the user interface element, the hiding of the user interface element, the deleting of the user interface element, the moving of the user interface element, the zooming of the window, the changing of the color, and the changing of the font. The user interface adjustment event can also be mouse clicking on a preset area.

A control signal transmitting module 724 stored in memory 11-12 and to be executed by one or more processors 11-10 is configured to transmit the control signal of adjusting the user interface to the script engine 710 when it has detected the user interface adjustment event.

The control signal transmitting module 724 stored in memory 11-12 and to be executed by one or more processors 11-10 can transmit the control signal of adjusting the user interface to the script engine 710 when it has detected the user interface adjustment event. The main program 720 can also directly adjust the user interface.

An user interface drawing module 726 stored in memory 11-12 and to be executed by one or more processors 11-10 is configured to receive the user interface data, which have been adjusted, from the script engine 710, to acquire the user interface element, which corresponds to the user interface data which have been adjusted, from the script engine 710 according to the user interface data which have been adjusted and then to draw the user interface according to the user interface element which has been acquired and the user interface data which have been adjusted.

The user interface drawing module 726 receives the user interface data, which have been adjusted, from the script engine 710 and acquires the user interface element from the script engine 710 according to the user interface data, which have been adjusted, so as to draw the user interface.

In this example, through detecting the user interface adjustment event, it is feasible to determine whether the main program 720 is necessary to adjust the user interface or not, when the user interface adjustment event has been detected, the control signal of adjusting the user interface is transmitted to the script engine 710, the script engine 710 completes the adjustment of the user interface data, and the main program 720 receives the user interface data which have been adjusted and draws the user interface according to the user interface data which have been adjusted; in this way, the user interface can be adjusted flexibly, and the efficiency of generating the user interface can be improved.

Figure 12:
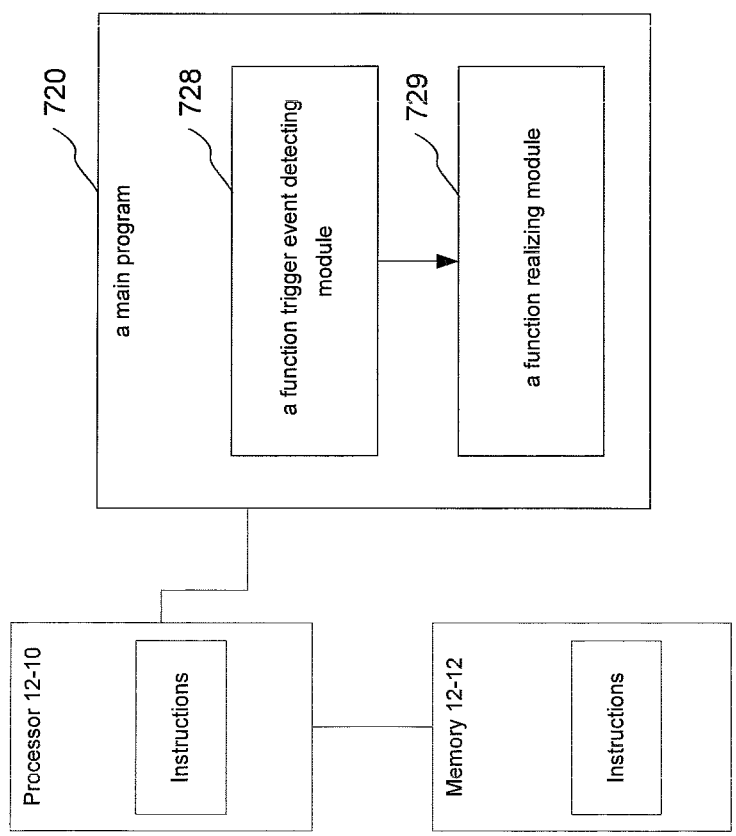
FIG. 12 shows a structural block diagram of a main program in one example.

As shown in FIG. 12, in one example, the main program 720 further comprises:

a function trigger event detecting module 728 stored in memory 12-12 and to be executed by one or more processors 12-10 that is configured to detect the function trigger event directed towards the user interface element;

a function realizing module 729 stored in memory 12-12 and to be executed by one or more processors 12-10 that is configured to complete the function of the user interface element, which corresponds to the function trigger event, according to the function trigger event when the function trigger event has been detected.

In this example, the user interface data are directly provided by the script engine 710, and the realization of the step that the main program 720 completes the function of the user interface element reduces the additional time consumed for generating the user interface when the main program 720 is started.

Figure 13:
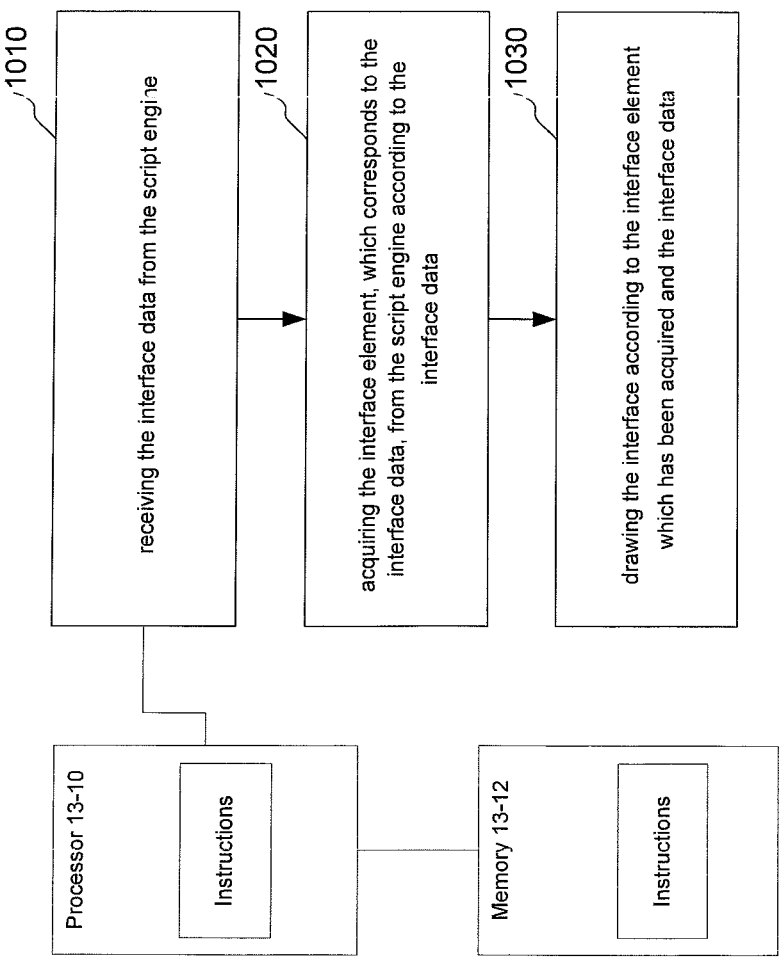
FIG. 13 shows a flow diagram of a method for generating a user interface in one example.

As shown in FIG. 13, in one example, another method for generating the user interface is also disclosed, comprising:

Step 1010: receiving the user interface data from the script engine.

The script engine can be one executable program or one DLL. The user interface data can comprise the layout data and the style data, and the layout data comprise the user interface element ID, the position information of the user interface element and the combination relation information of the user interface element. The style data can comprise at least one of the following items, i.e., the color, the font, the font size, and whether the user interface element is displayed or not. The position information comprises the initial coordinates, the height and the width of the user interface element in the drawing area.

The combination relation information of the user interface element can comprise the arrangement order of the user interface element and the position ID of the user interface element in the hierarchical structure. This hierarchical structure can comprise: at least one frame, at least one line and at least one user interface element; wherein the frame includes the line, and the line includes the user interface element. The hierarchical structure can further comprise the group, and the group includes the user interface element.

Step 1020: acquiring the user interface element, which corresponds to the user interface data, from the script engine according to the user interface data.

There is one user interface element library which exists in the script engine and includes the user interface element which is required for generating the user interface. It is feasible to acquire the user interface element from the user interface element library of the script engine according to the user interface element ID in the user interface data.

Step 1030: drawing the user interface according to the user interface element which has been acquired and the user interface data.

It is feasible to process the user interface element, which has been acquired, according to the information in the user interface data so as to draw the user interface.

In one example, this method for generating the user interface further comprises: detecting the function trigger event directed towards the user interface element; completing the function of the user interface element, which corresponds to the function trigger event, according to the function trigger event when the function trigger event has been detected.

In this example, it is feasible to acquire the user interface data directly from the script engine and to acquire the user interface element from the script engine according to the user interface data so as to draw the user interface, which improves the efficiency of generating the user interface so that the user interface can be quickly generated.

In another example, the step of receiving the user interface data from the script engine comprises:

detecting the user interface adjustment event.

The user interface adjustment event can comprise: at least one of the following items, i.e., the creating of the user interface element, the hiding of the user interface element, the deleting of the user interface element, the moving of the user interface element, the zooming of the window, the changing of the color, and the changing of the font. The user interface adjustment event can also be mouse clicking on a preset area.

When the user interface adjustment event has been detected, the control signal of adjusting the user interface is transmitted to the script engine.

When the user interface adjustment event has been detected, it is necessary to process the user interface data, so the control signal of adjusting the user interface is transmitted to the script engine, and the script engine processes the user interface data according to the control signal.

The user interface data that has been adjusted by the script engine according to the control signal are received.

The script engine adjusts the user interface data according to the control signal and feeds back the user interface data which have been adjusted. After the user interface data that have been adjusted have been received, the user interface can be drawn according to the user interface data which have been adjusted.

In this example, when the user interface adjustment event has been detected, the control signal of adjusting the user interface is transmitted to the script engine, the script engine completes the adjustment of the user interface data, and the main program receives the user interface data which have been adjusted and draws the user interface according to the user interface data which have been adjusted; in this way, the user interface can be adjusted flexibly, and the efficiency of generating the user interface can be improved.

Figure 14:
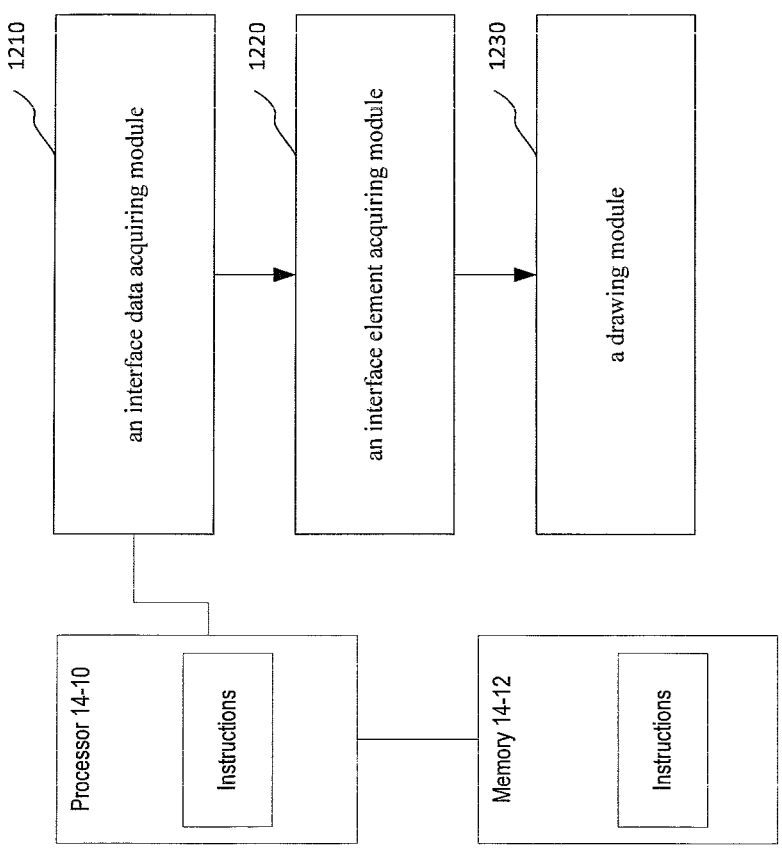
FIG. 14 shows a structural block diagram of a system for generating a user interface in another example.

As shown in FIG. 14, in one example, another system for generating the user interface is disclosed, comprising:

an user interface data acquiring module 1210 stored in memory 14-12 and to be executed by one or more processors 14-10 that is configured to receive the user interface data from the script engine.

The script engine can be one executable program or one DLL. The user interface data can comprise the layout data and the style data, and the layout data comprise the user interface element ID, the position information of the user interface element and the combination relation information of the user interface element. The style data can comprise at least one of the following items, i.e., the color, the font, the font size, and whether the user interface element is displayed or not. The position information comprises the initial coordinates, the height and the width of the user interface element in the drawing area.

The combination relation information of the user interface element can comprise the arrangement order of the user interface element and the position ID of the user interface element in the hierarchical structure. This hierarchical structure can comprise: at least one frame, at least one line and at least one user interface element; wherein the frame includes the line, and the line includes the user interface element. This hierarchical structure can further comprise the group, and the group includes the user interface element.

An user interface element acquiring module 1220 stored in memory 14-12 and to be executed by one or more processors 14-10 that is configured to acquire the user interface element, which corresponds to the user interface data, from the script engine.

There is one user interface element library which exists in the script engine and includes the user interface element which is required for generating the user interface. It is feasible to acquire the user interface element from the user interface element library of the script engine according to the user interface element ID in the user interface data.

A drawing module 1230 stored in memory 14-12 and to be executed by one or more processors 14-10 that is configured to draw the user interface according to the user interface element which has been acquired and the user interface data.

It is feasible to process the user interface element, which has been acquired, according to the information in the user interface data so as to draw the user interface.

In this example, it is feasible to acquire the user interface data directly from the script engine and to acquire the user interface element from the script engine according to the user interface data so as to draw the user interface, which improves the efficiency of generating the user interface so that the user interface can be quickly generated.

Figure 15:
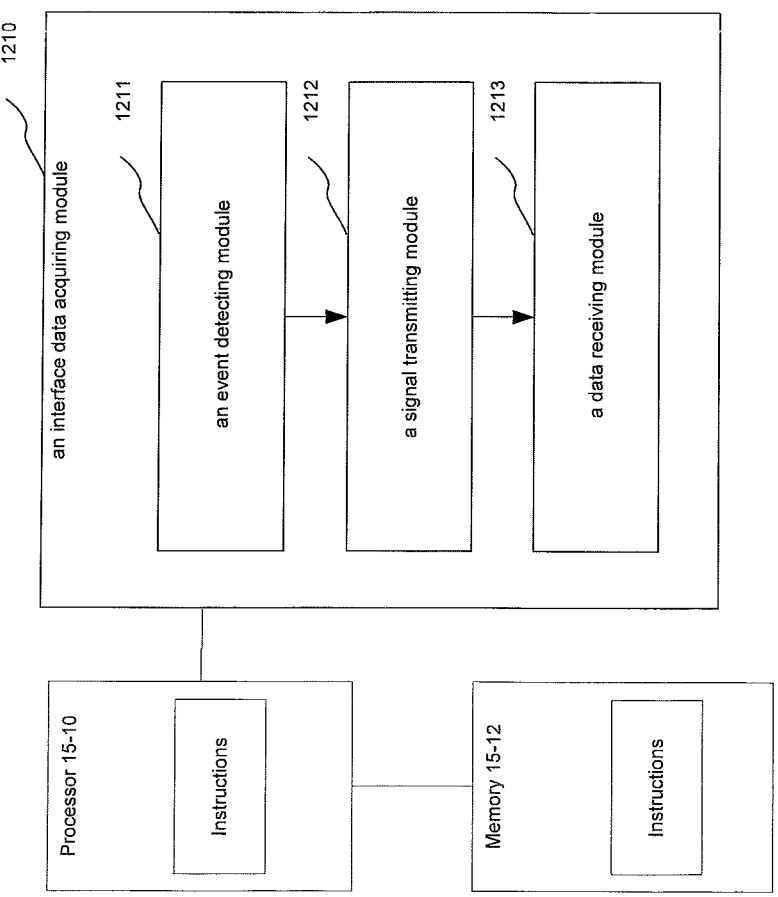
FIG. 15 shows a structural block diagram of a user interface data acquiring module as shown in FIG. 9.

As shown in FIG. 15, in another example, the user interface data acquiring module 1210 comprises:

an event detecting module 1211 stored in memory 15-12 and to be executed by one or more processors 15-10 that is configured to detect the user interface adjustment event.

The user interface adjustment event can comprise: at least one of the following items, i.e., the creating of the user interface element, the hiding of the user interface element, the deleting of the user interface element, the moving of the user interface element, the zooming of the window, the changing of the color, and the changing of the font. The user interface adjustment event can also be mouse clicking on a preset area.

A signal transmitting module 1212 stored in memory 15-12 and to be executed by one or more processors 15-10 that is configured to transmit the control signal of adjusting the user interface to the script engine when the user interface adjustment event has been detected.

When the user interface adjustment event has been detected, it is necessary to process the user interface data, so the control signal of adjusting the user interface is transmitted to the script engine, and the script engine processes the user interface data according to the control signal.

A data receiving module 1213 stored in memory 15-12 and to be executed by one or more processors 15-10 that is configured to receive the user interface data which has been adjusted by the script engine according to the control signal.

The script engine adjusts the user interface data according to the control signal and feeds back the user interface data which have been adjusted. After the data receiving module 1213 has received the user interface data which have been adjusted, the user interface can be drawn according to the user interface data which have been adjusted.

In this example, when the user interface adjustment event has been detected, the control signal of adjusting the user interface is transmitted to the script engine, the script engine completes the adjustment of the user interface data, and the main program receives the user interface data which have been adjusted and draws the user interface according to the user interface data which have been adjusted; in this way, the user interface can be adjusted flexibly, and the efficiency of generating the user interface can be improved.

Figure 16:
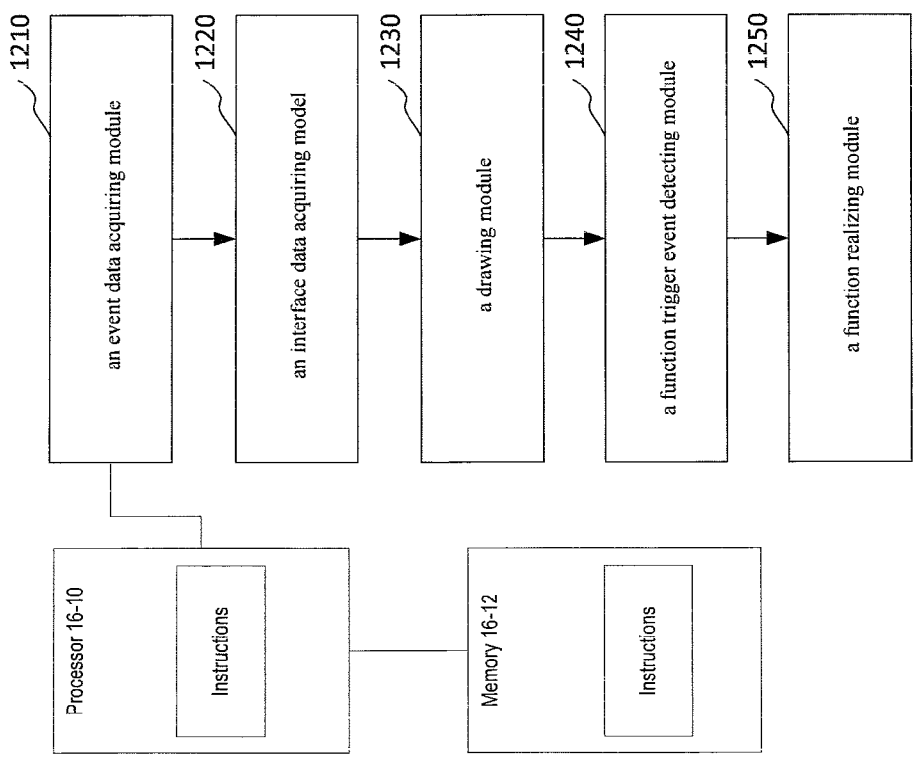
FIG. 16 shows a structural block diagram of a system for generating a user interface in one example.

As shown in FIG. 16, in one example, this system for generating the user interface further comprises:

a function trigger event detecting module 1240 stored in memory 16-12 and to be executed by one or more processors 16-10 that is configured to detect the function trigger event directed towards the user interface element.

A function realizing module 1250 stored in memory 16-12 and to be executed by one or more processors 16-10 that is configured to complete the function of the user interface element, which corresponds to the function trigger event, according to the function trigger event when the function trigger event has been detected.

In this example, the user interface data are directly provided by the script engine 710, and the realization of the step that the main program 720 completes the function of the user interface element reduces the additional time consumed for generating the user interface when the main program 720 is started.

Those of ordinary skill in the art may understand that the realization of the whole or partial flow in the method in the abovementioned examples may be completed through a computer program which instructs related hardware, the program may be stored in a computer-readable storage medium, and this program may comprise the flow of the examples of the abovementioned various methods at the time of execution. Wherein, the storage medium may be a disk, compact disk, read-only memory (ROM), or random access memory (RAM), etc.

Figure 17:
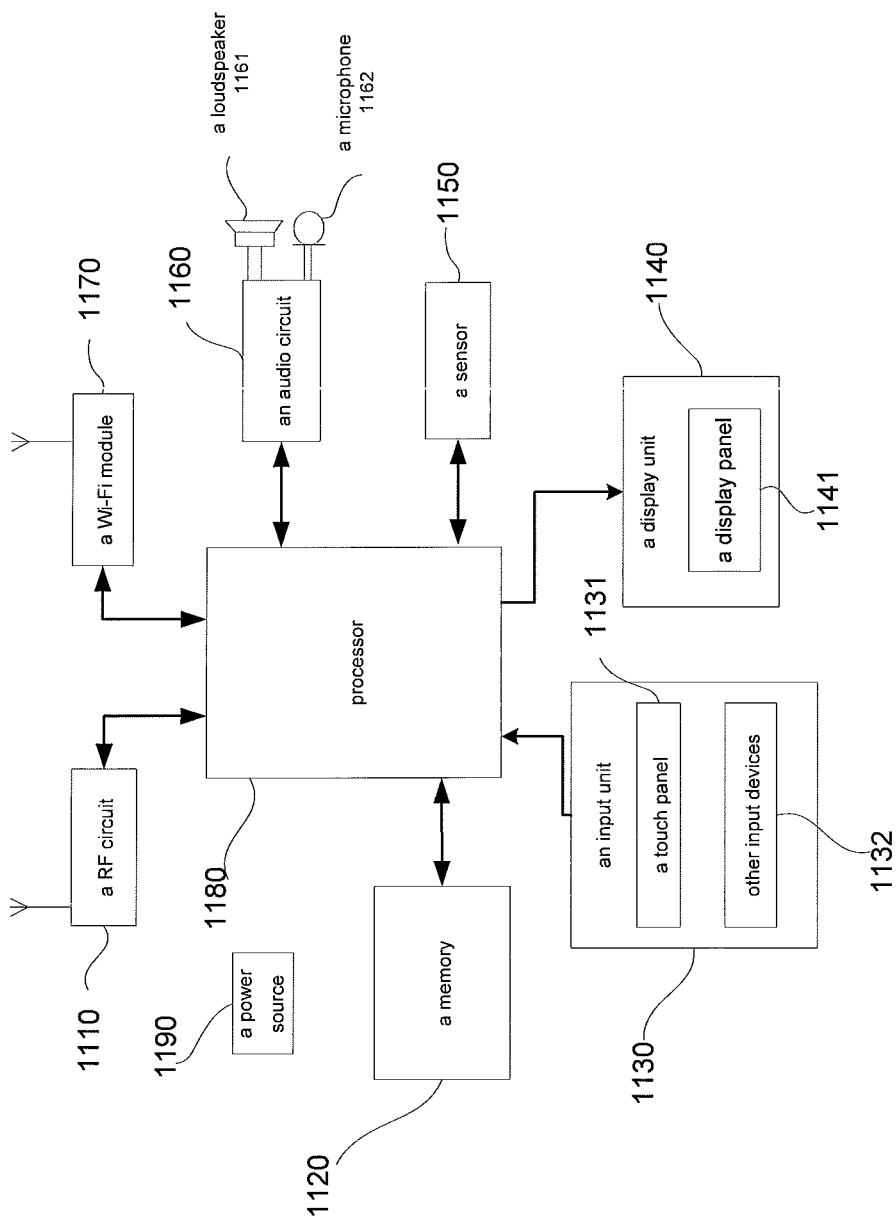
FIG. 17 shows a structural schematic diagram of a terminal for generating a user interface in one example.

The examples of the present disclosure also disclose another page sharing apparatus, as shown in FIG. 17, in order to be convenient for the description, only a part related to the examples of the present disclosure is shown, and please refer to the method part in the examples of the present disclosure for specific technical details which are not disclosed. This terminal can be any terminal device, including the mobile phone, the tablet PC, a PDA (Personal Digital Assistant), a POS (Point of Sales), a car PC, etc. The following example is given with the mobile phone as the terminal:

FIG. 17 shows a block diagram of a part of a structure of a mobile phone related to the terminal disclosed in the examples of the present disclosure. With reference to FIG. 17, the mobile phone comprises: a RF (Radio Frequency) circuit 1110, a memory 1120, an input unit 1130, a display unit 1140, a sensor 1150, an audio circuit 1160, a wireless communication module 1170, a processor 1180, a power source 1190, etc. Those of skill in the art may understand that as shown in FIG. 17, the structure of the mobile phone constitutes no limit to the mobile phone and can comprise the components more or less than what has been shown in the figure, or the power source combined with some components, or an arrangement of different components.

Each component of the mobile phone is specifically introduced in combination with FIG. 17 below:

The RF circuit 1110 can be configured to receive and transmit signals in the process of receiving and transmitting messages or conversations, particularly, to receive downstream information of a base station and then to transmit the downstream information to the processor 1180 for processing; in addition, to transmit designed upstream data to the base station. In general, the RF circuit comprises, but is not limited to, an antenna, at least one amplifier, a transceiver, a coupler, a low noise amplifier (LNA), a duplexer, etc. Moreover, the RF circuit 110 may also communicate with the network and other devices via wireless communication. The above wireless communication can use any communication standard or protocol, including but not limited to Global System of Mobile (GSM) communication, General Packet Radio Service (GPRS), Code Division Multiple Access (CDMA), Wideband Code Division Multiple Access (WCDMA), Long Term Evolution (LTE), E-mail, Short Messaging Service (SMS), etc.

The memory 1120 can be configured to store software programs and modules, and the processor 1180 can execute various function applications and data processing of the mobile phone through running the software programs and modules stored in the memory 1120. The memory 1120 can mainly comprise a program storage area and a data storage area, wherein the program storage area can store an operating system, an application program required for at least one function (such as a voice playing function and an image playing function), etc.; the data storage area can store data (such as audio data and a phone book), etc. created according to the use of the mobile phone. In addition, the memory 1120 can comprise a high-speed random access memory and also a nonvolatile memory, such as at least one disk memory device, a flash memory device or any other volatile solid-state memory device.

The input unit 1130 can be configured to receive numerical information or character information which has been input and to generate a key signal input related to user setting and function control of the mobile phone. Specifically, the input unit 1130 can comprise a touch panel 1131 and other input devices 1132. The touch panel 1131 is also called a touch screen, and it can collect the user's touch operation (for example, the user use any appropriate object or accessory, such as a finger and a touch pen, to operate on the touch panel 1131 or nearby the touch panel 1131) on or nearby it and drive a corresponding connecting device according to a preset program.

Optionally, the touch panel 1131 can comprise two parts, i.e., a touch detection device and a touch controller. Wherein, the touch detection device detects the user's touch directions and positions as well as signals brought from the touch operation and transmits the signals to the touch controller; the touch controller receives the touch information from the touch detection device, converts it into contact coordinates and then transmits the contact coordinates to the processor 1180, and it can also receive a demand sent from the processor 1180 and then execute the demand. In addition, it is feasible to use a plurality of types, such as a resistance type, a capacitance type, an infrared ray type, and a surface acoustic wave type, to realize the touch panel 1131. Besides the touch panel 1131, the input unit 1130 can also comprise other input devices 1132. Specifically, other input devices 1132 can comprise, but is not limited to, one or more devices, including a physical keyboard, a function key (such as a volume control key and a switch key), a trace ball, a mouse, an operating rod, etc.

The display unit 1140 can be configured to display the information, which has been input by the user or supplied to the user, and various menus of the mobile phone. The display unit 1140 can comprise a display panel 1141, and optionally, it can use a Liquid Crystal Display (LCD), an Organic Light-Emitting Diode (OLED), etc. to configure the display panel 1141. Furthermore, the touch panel 1131 can cover the display panel 1141, when the touch panel 1131 has detected any touch operation on or nearby it, it transmits the touch operation to the processor 1180 to determine the type of the touch event, and subsequently the processor 1180 provides a corresponding visual output on the display panel 1141 according to the type of the touch event. As shown in FIG. 17, the touch panel 1131 and the display panel 1141 are used as two independent components to realize input and output functions of the mobile phone, but in some examples, it is feasible to integrate the touch panel 1131 with the display panel 1141 so as to realize the input and output functions of the mobile phone.

The mobile phone can further comprise at least one type of sensor 1150, such as an optical sensor, a motion sensor, a NFC sensor, an acceleration sensor, a position sensor, and other sensors. Specifically, the optical sensor can comprise an ambient light sensor and a proximity sensor, wherein the ambient light sensor can adjust brightness of the display panel 1141 according to brightness and darkness of the ambient light, and the proximity sensor can turn off the display panel 1141 and/or backlight when the mobile phone is moved close to the ear. As one of the motion sensors, an accelerometer can detect values of the acceleration at various directions (three axes in general), in a static state, it can detect the value and the direction of the gravity, and it can be used for applications of identifying attitudes of the mobile phone (such as switching between a landscape mode and a portrait mode, related games, and calibration of altitudes of a magnetometer), functions related to vibration recognition (such as a pedometer and stroke), etc.; for other sensors, such as a gyroscope, a barometer, a hygrometer, a thermometer, and an infrared sensor, which the mobile phone can be configured with, will not be described with unnecessary details here.

The audio circuit 1160, a loudspeaker 1161 and a microphone 1162 can supply an audio user interface between the user and the mobile phone. On one hand, the audio circuit 1160 can transmit electrical signals converted from audio data, which have been received, to the loudspeaker 1161, and the loudspeaker 1161 converts the electrical signals into sound signals to be output; on the other hand, the microphone 1162 converts the sound signals, which have been collected, into the electrical signals, the audio circuit 1160 receives the electrical signals, converts the electrical signals into the audio data, outputs the audio data to the processor 1180 for processing and then transmits the audio data, which have been processed, to, for example, another mobile phone via the RF circuit 1110 or outputs the audio data to the memory 1120 for further processing.

The wireless communication module 1170 comprises, but is not limited to, a wireless fidelity (Wi-Fi) module, a Bluetooth module, an infrared communication module, etc. The mobile phone can help the user receive and send E-mails, browser web pages and access stream media through the wireless communication module 1170 which provides the user with an access to the wireless broadband Internet. Although the Wi-Fi module 1170 is as shown in FIG. 17, it is understandable that it is not a necessary component of the mobile phone 1100 and can be absolutely omitted according to the need, provided that the nature of the disclosure will not be modified.

The processor 1180 is a control center of the mobile phone, and it utilizes various user interfaces and lines to connect various parts of the whole mobile phone and executes various functions and processing data of the mobile phone through running or executing the software programs and/or modules stored in the memory 1120 and calling the data stored in the memory 1120 so as to conduct overall monitoring of the mobile phone. Optionally, the processor 1180 can comprise one or more processing units; preferentially, the processor 1180 can be integrated with an application processor and a modem processor, wherein the application processor mainly processes the operating system, the user interface, the application program, etc., and the modem processor mainly processes the wireless communication. It is understandable that the above modem processor may not be integrated into the processor 1180.

The mobile phone further comprises the power source 1190 (such as a battery) which supplies power to each component, and preferentially, the power source can be logically connected with the processor 1180 via a power source management system so as to realize functions, such as charge, discharge, and power management, through the power source management system.

Although not shown, the mobile phone can further comprise a video camera, a Bluetooth module, etc., which will not be described with unnecessary details here.

In the examples of the present disclosure, the processor 1080 comprised in this terminal also has the following functions: configured to receive the user interface data from the script engine; to acquire the user interface element, which corresponds to the user interface data, from the script engine according to the user interface data; to draw the user interface according to the user interface element which has been acquired and the user interface data.

In one example, the processor 1180 also has the following function: detecting the function trigger event directed towards the user interface element; transmitting the control signal of adjusting the user interface to the script engine when the user interface adjustment event has been detected; receiving the user interface data which have been adjusted by the script engine according to the control data.

In one example, the user interface adjustment event comprises: at least one of the following items, i.e., the creating of the user interface element, the hiding of the user interface element, the deleting of the user interface element, the moving of the user interface element, the zooming of the window, the changing of the color, and the changing of the font.

In one example, the user interface data can comprise the layout data and the style data, and the layout data comprise the user interface element ID, the position information of the user interface element and the combination relation information of the user interface element.

In one example, the style data comprise at least one of the following items, i.e., the color, the font, the font size, and whether the user interface element is displayed or not In one example, the combination relation information of the user interface element comprises the arrangement order of the user interface element and the position ID of the user interface element in the hierarchical structure.

In one example, the hierarchical structure comprises: at least one frame, at least one line and at least one user interface element; wherein the frame includes the line, and the line includes the user interface element.

In one example, the hierarchical structure comprises: at least one group, and the group includes the user interface element.

In one example, the position information comprises: the initial coordinates, the height and the width of the user interface element in the drawing area.

In one example, the processor 1180 also has the following functions: configured to detect the function trigger event directed towards the user interface element; to complete the function of the user interface element, which corresponds to the function trigger event, according to the function trigger event when it has detected the function trigger event.

The above described examples only express several examples of the present disclosure, the description of them is relatively specific and detailed, but it shall not be understood as any limit to the scope of the patent in accordance with the present disclosure. It should be noted that those of ordinary skill in the art can make some alternations and improvements under the precondition of not departing from the conception of the present disclosure, and all of these alternations and improvements are covered by the protective scope of the patent disclosure. Therefore, the protective scope of the patent in accordance with the present disclosure shall be subject to the attached claims.

The invention claimed is:

1. A method for generating a user interface, comprising:
   reading, by a script engine, a user interface description file, wherein the script engine comprises a memory having stored therein a user interface element library comprising a plurality of user interface elements, and one or more processors in communication with the memory;
   analyzing, by the script engine, the user interface description file;
   generating, by the script engine, user interface data;
   transmitting, by the script engine, the user interface data to a main program, the main program being independent of the script engine;
   acquiring, by the main program, from the script engine, a user interface element corresponding to the user interface data;
   drawing, by the main program, a user interface according to the user interface element and the user interface data;
   detecting, by the main program, a user interface adjustment event;
   transmitting, by the main program, a control signal of adjusting the user interface to the script engine when the user interface adjustment event is detected, wherein the control signal comprises which user interface elements have been adjusted;

adjusting, by the script engine, the user interface data according to the control signal and transmitting the user interface data that have been adjusted to the main program;

acquiring, by the main program, the user interface element corresponding to the user interface data that have been adjusted, from the script engine; and drawing, by the main program, the user interface according to the user interface element that has been acquired.

2. The method according to claim 1, wherein the user interface adjustment event comprises at least one of:
creating the user interface element,
hiding the user interface element,
deleting the user interface element,
moving the user interface element,
zooming a window,
changing a color, or
changing a font.

3. The method according to claim 1, further comprising:
reading and analyzing, by the script engine, the user interface description file to acquire a user interface element identification and combination relation information and style data of the user interface element wherein the combination relation information comprises an arrangement order of the user interface element and a position identification of the user interface element in a hierarchical structure;

calculating, by the script engine, position information of the user interface element according to the user interface element identification and the combination relation information to generate layout data wherein the layout data comprise the user interface element identification, the position information and the combination relation information;

transmitting, by the script engine, the user interface data comprising the layout data and the style data to the main program;

detecting, by the main program, a function trigger event that is directed towards the user interface element; and completing, by the main program, a function of the user interface element corresponding to the function trigger event and according to the function trigger event when the function trigger event is detected.

4. The method according to claim 3, wherein the style data comprises at least one of: color, font, font size, or whether the user interface element is displayed;

wherein the hierarchical structure comprises: at least one frame, at least one line, at least one user interface element and at least one group, wherein the frame includes the line, the line includes the user interface element and the group includes the user interface element; and the method further comprising:
acquiring, by the script engine, size information of the user interface element according to the user interface element identification; and calculating, by the script engine, the position information of the user interface element line by line from a first line of the hierarchical structure according to the size information and the combination relation information, wherein the position information comprises: initial coordinates, height and width of the user interface element in a drawing area.

5. The method according to claim 1, further comprising:
generating, by the script engine, a preview of the user interface according to the user interface description file.

6. A system for generating a user interface, comprising:
memory;
one or more processors;
a script engine having the memory having stored therein a user interface element library comprising a plurality of user interface elements, and the one or more processors in communication with the memory that is configured to:
read a user interface description file,
analyze the user interface description file,
generate user interface data, and
transmit the user interface data to a main program; and a main program, wherein the main program is independent of the script engine, stored in the memory to be executed by the one or more processors that is configured to:
acquire a user interface element corresponding to the user interface data,
draw the user interface according to the user interface element that has been acquired, and the user interface data,
detect a user interface adjustment event,
transmit a control signal of adjusting the user interface to the script engine such that the script engine is configured to adjust the user interface data according to the control signal and transmit the user interface data that have been adjusted to the main program when the user interface adjustment event is detected, wherein the control signal comprises which user interface elements have been adjusted,
acquire the user interface element corresponding to the user interface data that have been adjusted, from the script engine, and
draw the user interface according to the user interface element that has been acquired.

7. The system according to claim 6, wherein the user interface adjustment event comprises at least one of:
creating the user interface element,
hiding the user interface element,
deleting the user interface element,
moving the user interface element,
zooming a window,
changing a color, or
changing a font.

8. The system according to claim 6, wherein the script engine further comprises:
an user interface description analyzing module stored in the memory and to be executed by the one or more processors that is configured to:
read and analyze the user interface description file to acquire an user interface element identification and combination relation information and style data of the user interface element wherein the combination relation information comprises an arrangement order of the user interface element a position of the user interface element in a hierarchical structure;

a layout data generating module stored in the memory and to be executed by the one or more processors that is configured to:
calculate position information of the user interface element according to the user interface element identification and the combination relation information to generate layout data wherein the layout data comprise the user interface element identification, the position information and the combination relation information;

a user interface data transmitting module stored in the memory and to be executed by the one or more processors that is configured to:

transmit the user interface data comprising the layout data and the style data to the main program;

wherein the main program further comprises:

a function trigger event detecting module stored in the memory and to be executed by the one or more processors that is configured to detect a function trigger event that is directed towards the user interface element; and a function realizing module stored in the memory and to be executed by the one or more processors that is configured to complete a function of the user interface element corresponding to the function trigger event and according to the function trigger event when the function trigger event is detected.

9. The system according to claim 8, wherein the style data comprise at least one of: color, font, font size, or whether the user interface element is displayed;

wherein the hierarchical structure comprises: at least one frame, at least one line, at least one user interface element and at least one group wherein the frame includes the line, the line includes the user interface element and the group includes the user interface element;

wherein the layout data generating module further comprises:

a size information acquiring module stored in the memory and to be executed by the one or more processors that is configured to acquire the size information of the user interface element according to the user interface element identification;

a position information calculating module stored in the memory and to be executed by the one or more processors that is configured to calculate the position information of the user interface element line by line from a first line of the hierarchical structure according to the size information and the combination relation information, wherein the position information comprises: initial coordinates, height and width of the user interface element in a drawing area.

10. The system according to claim 6, wherein the script engine is further configured to: generate a preview of the user interface according to the user interface description file.

* * * * *